United States Patent [19]

Mine et al.

[11] 4,269,753

[45] May 26, 1981

[54] SILOXANE COMPOSITIONS WHICH CAN BE CERAMIFIED AT HIGH TEMPERATURES

[75] Inventors: Katsutoshi Mine; Tsuneo Maruyama, both of Ichihara; Kazuhide Takeshita, Tokyo, all of Japan

[73] Assignee: Toray Silicone Company, Ltd., Tokyo, Japan

[21] Appl. No.: 115,983

[22] Filed: Jan. 28, 1980

[30] Foreign Application Priority Data

Mar. 7, 1979 [JP] Japan .................................. 54/25646

[51] Int. Cl.$^3$ ............................................. C08K 5/05
[52] U.S. Cl. .......................... 260/33.4 SB; 260/37 SB
[58] Field of Search ..................... 260/37 SB, 33.4 SB

[56] References Cited

U.S. PATENT DOCUMENTS

| | | | |
|---|---|---|---|
| 3,361,583 | 1/1968 | Elarde et al. ..................... | 260/37 SB |
| 3,699,073 | 10/1972 | Wada et al. ....................... | 260/37 SB |
| 4,041,010 | 8/1977 | Jeram ................................ | 260/37 SB |
| 4,196,273 | 4/1980 | Imai et al. ......................... | 260/37 SB |

*Primary Examiner*—Lewis T. Jacobs
*Attorney, Agent, or Firm*—Robert L. McKellar

[57] ABSTRACT

This invention deals with siloxane compositions which can be readily converted to elastomers or resins at normal curing temperatures but will ceramify upon firing to higher temperatures to give flexible ceramics having electrical insulating properties and excellent physical properties.

7 Claims, No Drawings

SILOXANE COMPOSITIONS WHICH CAN BE CERAMIFIED AT HIGH TEMPERATURES

BACKGROUND OF THE INVENTION

The present invention deals with siloxane compositions which are converted to elastomeric or resinous films upon curing and are further converted to strong, hard ceramic substances when exposed to high temperatures in excess of 500° C.

Silicone resins have been used in a wide variety of fields as electric insulating materials because of their excellent physical properties and electrical properties. For example, electric wires and cables covered with silicone rubber or silicone resins in order to improve the physical strength and electrical insulation are widely known.

These wire or cable coverings of silicone rubber or silicone resins, unlike the inorganic insulating materials, burn away when they are exposed to high temperatures above 500° C. which usually results in a striking decrease or complete loss of electrical insulating performance. Silicone rubber or silicone resins are known to leave inorganic ash as a combustion residue. When these materials are used as electrical insulation, the residual ash either scatters off, or, if it remains on the conducting material, it is extremely brittle, has dehydration cracks and is in such a state that the residual material comes off the conducting material and therefore fails to function as an electrical insulating material.

It is known that some castable silicone materials form ceramics and do not lose their original shapes when they are exposed to high temperatures. However, these materials, at ordinary temperatures, are generally resinous substances without flexibility and they are not suitable as electrical insulating materials for the parts where flexibility is required.

Ceramic products have been known for their excellent heat resistance and electrical properties. However, their use is limited because of the difficulty in working with them.

In recent years materials which can maintain their original shape and electrical insulating property in spite of exposure to high temperatures, such as material for refractory electrical wire for exposed wiring in an emergency electric source circuit, have been in high demand. Japanese Publication No. 51{1976}-60240 and Japanese Publication No. 51{1976}-82319 are known to respond to these demands. These materials, which have silica fillers as an indispensable component tend to cause the burning of the surface when the cured substance is exposed to high temperatures or they undergo partial foaming, resulting in difficulty in producing uniform ceramified materials of high dimensional stability.

The present invention offers silicone compositions which have overcome the above-mentioned shortcomings of the already existing materials. When these compositions are cured, they become elastomers or resinous substances within the range of temperatures in which these materials are ordinarily used. Upon exposure to high temperatures, these materials are ceramified to yield homogeneous and dense ceramics with excellent dimensional stability, strength and electrical insulating properties.

THE INVENTION

The present invention consists of a composition of matter which consists essentially of (A) 100 parts by weight of a siloxane copolymer consisting essentially of $R_3SiO_{\frac{1}{2}}$ units and $SiO_{4/2}$ units wherein R is a monovalent organic radical having 1–10 carbon atoms and containing at least two unsaturated groups and at least two alkoxy groups bound to silicon atoms per molecule, (B) 0–600 parts by weight of a linear or branched organopolysiloxane polymer having at least two unsaturated groups bound to silicon atoms per molecule, (C) an organopolysiloxane having at least two hydrogen atoms bonded to silicon atoms per molecule, (D) 3–300 parts by weight of a ceramic forming filler substance and, (E) a catalytic amount of an addition reaction catalyst wherein in the components (A), (B) and (C) the mole ratio of hydrogen atoms bound to silicon atoms to unsaturated groups bound to silicon is from 0.5/1 to 10/1 and the total number of unsaturated groups in component (A) and component (B) and the total number of hydrogen atoms bonded to silicon atoms in component (C) is at least five.

This invention also concerns a solid substrate coated with the inventive composition and the substrate when coated with the inventive composition, and heated to 500° C. or higher to form a ceramic.

Thus, this invention is also a solid substrate coated with a composition of matter consisting essentially of (A) 100 parts of a siloxane copolymer consisting essentially of $R_3SiO_{\frac{1}{2}}$ units and $SiO_{4/2}$ units wherein R is a monovalent organic radical having 1–10 carbon atoms and containing at least two unsaturated groups and at least two alkoxy groups bound to silicon atoms per molecule, (B) 0–600 parts by weight of a linear or branched organopolysiloxane polymer having at least two unsaturated groups bound to silicon atoms per molecule, (C) an organopolysiloxane having at least two hydrogen atoms bonded to silicon atoms per molecule, (D) 3–300 parts by weight of a ceramic forming filler substance and, (E) a catalytic amount of an addition reaction catalyst wherein in the components (A), (B) and (C) the mole ratio of hydrogen atoms bound to silicon atoms to unsaturated groups bound to silicon is from 0.5/1 to 10/1 and the total number of unsaturated groups in component (A) and component (B) and the total number of hydrogen atoms bonded to silicon atoms in component (C) is at least five.

Component (A), the siloxane copolymer, is the main component of this invention. This component consists of $R_3SiO_{\frac{1}{2}}$ units and $SiO_{4/2}$ units and may also contain small amounts of $R_2SiO_{2/2}$ or $RSiO_{3/2}$ units. The mole ratio of $R_3SiO_{\frac{1}{2}}$ units to $SiO_{4/2}$ units for purposes of this invention is from 0.2/1 to 2.5/1. R is a monovalent organic radical having 1–10 carbon atoms. R can be for example methyl, ethyl or phenyl groups. Methyl is the preferred group in this invention. The copolymer must contain at least two olefinically unsaturated groups per molecule and in addition, the copolymer must contain at least two hydrocarbonoxy (alkoxy) groups per molecule. When R is olefinically unsaturated groups they are selected from lower alkenyl groups such as vinyl, allyl and isopropenyl groups. Also, gamma-methacryloxypropyl groups and gamma-acryloxypropyl groups are within the scope of this invention. Preferred are vinyl groups.

It is preferred that the amount of olefinic unsaturation in the copolymer be 3–25 mol% of the total R groups in the composition. In component (C), there is required to be at least two hydrogen atoms bound to silicon atoms. Since components (A) and (B) contain olefinic unsaturation and component (C) contains silicon bound hydrogen and since these groups are essential for the cure of the inventive composition, it is imperative that such groups be balanced for the correct cure. Further, since one of the olefinically bearing components, component (B) can be absent i.e. 0-600 parts, it is essential that component (A), in the absence of any component (B), be present in certain minimum amounts. Therefore, when component (B) is absent, there must be at least three olefinically unsaturated groups in each molecule of (A) when there is two hydrogen atoms bonded to silicon atoms in component (C). Component (A) and Component (C) are then able to undergo the required addition reaction to cross-link and form an elastomer or resinous film. The alkoxy groups present in the copolymer have the following unit formulas: $R_2(R'O)SiO_{\frac{1}{2}}$, $R(R'O)_2SiO_{\frac{1}{2}}$, $(R'O)_3SiO_{\frac{1}{2}}$, $R(R'O)SiO_{\frac{1}{2}}$, $(R'O)_2SiO_{\frac{1}{2}}$ and $(R'O)SiO_{3/2}$ units wherein (R'O) is an alkoxy group and wherein R is the same as defined above and R' is a monovalent hydrocarbon radical containing 1-10 carbon atoms. The alkoxy groups are required in this invention in order to promote high temperature ceramification and for improving the strengths of the resulting ceramics. Especially preferred alkoxy groups are methoxy, ethoxy and benzyloxy groups.

Component (A), the siloxane copolymer, can be easily produced by employing various methods. Examples of such methods are the co-hydrolysis of trimethylmonochlorosilane, dimethylvinylmonochlorosilane and tetrachlorosilane followed by the alkoxylation of the silanol group in the siloxane copolymer; the partial co-hydrolysis of trimethylmethoxysilane, dimethylvinylmethoxysilane and ethyl orthosilicate; the reaction between a silica sol obtained by acidifying water glass and trimethylmonochlorosilane and dimethylvinylmonochlorosilane followed by the alkoxylation of silanol groups; and the partial condensation of the silanol groups in a siloxane copolymer consisting of trimethylsiloxane units and $SiO_{4/2}$ units with the methoxy groups in vinyltrimethoxysilane.

The present component is usually a solid or powder at room temperature which melts when heated.

Component (B) is used for adjusting the viscosity of the composition of the present invention and for enhancing the flexibility of the cured substance. It is not always necessary. Since the presence of an excessive amount of this component inhibits the ceramification of the cured substance, the use of the present component is limited to 600 parts by weight or less per 100 parts by weight of component (A).

Although the viscosity of the component (B) is not limited, usually it is 0.010–100 Pa·s at 25° C. The olefinic unsaturated groups are the same as described in component (A) above. They may be present either on the ends of the molecular chains or in side chains or they may be present in both places. The number of these olefinically-unsaturated groups should be at least 2 per molecule, but usually their amount should not exceed 50 mol% of the total organic groups. If the number of hydrogen atoms bonded to silicon atoms in component (C) is 2 per molecule, the number of olefinically-unsaturated groups per molecule of the component (B) should be at least 3. Examples of organic groups other than the olefinically-unsaturated groups are methyl groups, ethyl groups and phenyl groups. Methyl groups are most preferred.

Component (C), the silicon hydrogen bearing siloxane, is an organopolysiloxane having at least 2 hydrogen atoms bound to silicon atoms per molecule. Component (C) acts as a cross-linking agent when it reacts with components (A) and (B) in an addition reaction. Any linear, branched, cyclic or network structure is acceptable. It is desirable that this component is a liquid at room temperature.

Examples of organic groups in component (C) are methyl groups, ethyl groups, propyl groups and phenyl groups. Methyl groups are most preferred.

For the composition of the present invention to take the form of an elastomer or resin after being cured, the total number of olefinically-unsaturated groups in component (A) and/or component (B) and the hydrogen atoms bound to silicon atoms in component (C) should be at least 5.

The amount of components (C) is adjusted so that the mole ratio of the hydrogen atoms bound to silicon atoms in component (C) to the olefinically-unsaturated groups in component (A) and component (B) is from 0.5/1 to 10/1.

Component (D), the ceramic forming filler, is a component especially important for ceramifying the composition of the present invention at high temperatures. Examples of ceramic forming fillers are glass, asbestos, minerals such as kaolinite or montmorillonite, mica, talc, aluminum silicate, magnesium silicate, zinc oxide, magnesium oxide, tungsten carbide, titanium carbide, molybdenum carbide, sodium aluminate, silicon nitride, boron nitride, aluminum nitride, aluminum oxide, zirconium titanate, silicon carbide, potassium titanate, zinc silicate, zirconium silicate, titanium silicate, complex silicates such as potassium aluminum silicate and lithium aluminum silicate. The ceramic forming filler may be one from natural sources or it may be a synthetic substance, but it is desirable to be in a finely powdered state such as is used in commercial ceramics. An increase in the amount of component (D) generally increases the ceramic properties of the composition when it is exposed to high temperatures. However, considering the flexibility of the cured film of the composition at ordinary temperature and other temperatures, the amount should be 5–100 parts by weight. Mixtures of the ceramic forming filler are contemplated within the scope of this invention.

Component (E), the catalyst, may be any catalyst that is effective in the addition reaction between hydrogen atoms bound to silicon atoms and the olefinically-unsaturated groups. Examples of such catalysts are finely divided elemental platinum, finely divided platinum dispersed in carbon powder, chloroplatinic acid, coordination compounds of chloroplatinic acid and vinylsiloxane, tetrakis(triphenylphosphine)palladium, a mixture of palladium black and triphenylphosphine, and rhodium catalyst. Platinum or platinum compounds are desirable. This component is indispensable for the cross-linking by means of the addition reaction. In addition, it is also important to complete the ceramification of the present composition. The amount of addition of component (E) is 1–1000 parts by weight based on platinum metal for every 1,000,000 parts by weight of component (A).

In order to prepare the composition of the present invention, components (A)–(D) are first mixed with a known mixing device such as a Ross mixer, planetary mixer, a kneader mixer, a two-roll mixer, or others, and then component (E) is mixed in just prior to the use of the composition. Components (A)–(D) may be mixed simultaneously, or they may be mixed stepwise. The use of stirring under heating in order to attain homogeneous mixing is also contemplated within the scope of this invention.

When all of the above components are mixed and maintained at a certain temperature for a certain time, the composition of the present invention cures, and, depending on the kinds of various components and their mutual proportions, it is converted to an elastomer or resin. Although curing is possible at room temperature, heating of the composition at 50°-200° C. or higher temperatures is advantageous if quick curing is desired.

Whether it is converted to an elastomer or a resin by curing, the composition of the present invention is ceramified when it is exposed to a temperature higher than 500° C. It yields a homogeneous and dense ceramic substance with excellent dimensional stability, strength and electrical insulating properties.

Thus, also contemplated within the scope of this invention is an inventive composition coated on a solid substrate and heated to 500° C. or higher to ceramify which composition consists essentially of (A) 100 parts by weight of a siloxane copolymer consisting essentially of $R_3SiO_{\frac{1}{2}}$ units and $SiO_{4/2}$ units wherein R is a monovalent organic radical having 1-10 carbon atoms and containing at least two unsaturated groups and at least two alkoxy groups bound to silicon atoms per molecule, (B) 0-600 parts by weight of a linear or branched organopolysiloxane polymer having at least two unsaturated groups bound to silicon atoms per molecule, (C) an organopolysiloxane having at least two hydrogen atoms bonded to silicon atoms per molecule, (D) 3-300 parts by weight of a ceramic forming filler substance and, (E) a catalytic amount of an addition reaction catalyst wherein in the components (A), (B) and (C) the mole ratio of hydrogen atoms bound to silicon atoms to unsaturated groups bound to silicon is from 0.5/1 to 10/1 and the total number of unsaturated groups in component (A) and component (B) and the total number of hydrogen atoms bonded to silicon atoms in component (C) is at least five.

Some known adjuvants can be used with the above-mentioned composition, if desired. Such adjuvants can be addition-reaction-delaying agents such as benzotriazole, 2-ethylisopropanol and dimethyl sulfoxide, heat resistance agents, pigments, and such organic solvents as xylene, toluene and trichloroethylene.

The compositions of the present invention are extremely useful when they are used in cases where mechanical strength and electrical insulation are demanded in a physical state where the material is exposed to high temperatures, as the shielding materials for fire resistant electrical wire or cables, impregnating agents and coating materials for transformers, coating materials for insulators for high tension transmission cable and other uses.

The present invention will be explained with experimental examples below, but the invention should not be construed to be limited by these examples.

EXAMPLES 1-6

Component (A)—100 parts by weight of a siloxane copolymer consisting of 43 mol% of $SiO_{4/2}$ units, 30 mol% of $(CH_3)_3SiO_{\frac{1}{2}}$ units, 15 mol% of $(CH_3)_2(CH_2=CH)SiO_{\frac{1}{2}}$ units and $CH_2=CH(CH_3O)_2SiO_{\frac{1}{2}}$ units; component (B)—30 parts by weight of 0 part by weight of a dimethylvinyl endblocked dimethylpolysiloxane having the following formula,

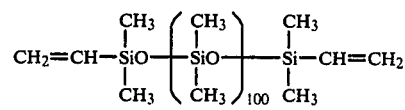

component (C)—5 parts by weight of methylhydrogensiloxane-dimethylsiloxane copolymer expressed by the following formula

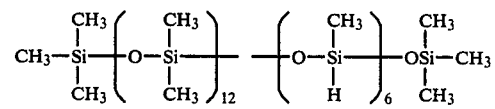

and as component (D), either zinc oxide powder, alumina powder and/or mica powder totaling 50 parts by weight, were mixed. To this mixture, 1 part by weight of a 1 wt% solution of chloroplatinic acid in isopropyl alcohol was added and thoroughly mixed. The resulting composition was poured into a metal mold 2 mm in depth, and molded under pressure at 150° C. for 15 minutes. The resulting sheet showed flexibility. When this sheet was exposed to air at 850° C. for 30 minutes, it turned to a strong and hard ceramic substance completely free of cracks. As control examples, the above-mentioned composition minus component (A) and the above-mentioned composition minus component (D) were cured in the same way and then exposed to the high temperature. The results are shown in Table I.

Next, the same composition was used to cover a 1 mm$\phi$ copper wire in a thickness of 0.5 mm by means of extrusion molding. The covering was cured by heating at 200° C. for 5 minutes. The resulting covered electrical wire showed good flexibility. When this electrical wire was exposed to air at 850° C. for 30 minutes in the same manner as described above, the covering turned to a strong and hard ceramic substance without developing any cracks whatsoever and without separating from the copper wire.

TABLE I

| Composition (parts by weight) | Experimental Example |   |   |   |   |   | Control |   |
|---|---|---|---|---|---|---|---|---|
|  | 1 | 2 | 3 | 4 | 5 | 6 | 1 | 2 |
| (A) | 100 | 100 | 100 | 100 | 100 | 100 | 100 | — |
| (B) | 30 | 30 | 30 | 30 | 30 | — | 30 | 130 |
| (C) | 5 | 5 | 5 | 5 | 5 | 5 | 5 | 5 |
| (D) |  |  |  |  |  |  |  |  |
| Zinc oxide | 50 | — | — | 25 | — | — | — | — |
| alumina | — | 50 | — | 25 | 25 | — | — | — |
| mica | — | — | 50 | — | 25 | 50 | — | 50 |
| (E) | 1.0 | 1.0 | 1.0 | 1.0 | 1.0 | 1.0 | 1.0 | 1.0 |

| Test | Physical properties of cured sheet | | | | | | Control | |
|---|---|---|---|---|---|---|---|---|
| | Experimental Example | | | | | | | |
| | 1 | 2 | 3 | 4 | 5 | 6 | 1 | 2 |
| tensile strength (kg/cm$^2$) | 35 | 40 | 38 | 30 | 42 | 48 | 28 | 25 |
| Elongation (%) | 100 | 120 | 115 | 120 | 105 | 80 | 150 | 110 |
| Sheet after treatment at 850° C. for 30 minutes | no foaming, no cracks | no foaming, no cracks | no foaming, no cracks | no foaming, no cracks | no foaming, no cracks | no foaming, no cracks | fragmented | a number of cracks |

That which is claimed is:

1. A composition of matter consisting essentially of
(A) 100 parts by weight of a siloxane copolymer consisting essentially of $R_3SiO_{\frac{1}{2}}$ units and $SiO_{4/2}$ units wherein R is a monovalent organic radical having 1-10 carbon atoms and containing at least two unsaturated groups and at least two alkoxy groups bound to silicon atoms per molecule,
(B) 0-600 parts by weight of a linear or branched organopolysiloxane polymer having at least two unsaturated groups bound to silicon atoms per molecule,
(C) an organopolysiloxane having at least two hydrogen atoms bonded to silicon atoms per molecule,
(D) 3-300 parts by weight of a ceramic forming filler substance and,
(E) a catalytic amount of an addition reaction catalyst wherein in the components (A), (B) and (C) the mole ratio of hydrogen atoms bound to silicon atoms to unsaturated groups bound to silicon is from 0.5/1 to 10/1 and the total number of unsaturated groups in component (A) and component (B) and the total numer of hydrogen atoms bonded to silicon atoms in component (C) is at least five.

2. The composition of claim 1 wherein for every 100 parts by weight of component (A) there is present 0-30 parts by weight of component (B), 5 parts of component (C), 20 to 100 parts by weight of component (D) and 1 part by weight of a one percent solution of chloroplatinic acid in isopropyl alcohol as component (E).

3. The composition as claimed in claim 1 wherein component (A) is a copolymer consisting essentially of 43 mol% $SiO_{4/2}$ units, 30 mol% of $(CH_3)_3SiO_{\frac{1}{2}}$ units, 15 mol% of $(CH_3)_2(CH_2=CH)SiO_{\frac{1}{2}}$ units and 12 mol% $CH_2=CH(CH_3O)_2SiO_{\frac{1}{2}}$ units; component (B) is a vinyldimethyl endblocked polydimethylsiloxane; component (C) is a methylhydrogensiloxane-dimethylsiloxane copolymer; component (D) is selected from a group consisting of zinc oxide powder, alumina powder and mica powder and component (E) is a catalytic amount of chloroplatinic acid in an alcohol solvent.

4. The composition claimed in claim 3 wherein component (B) is

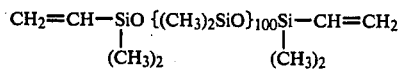

and component (C) is

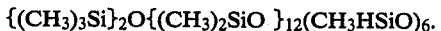

5. A solid substrate coated with the composition of claim 1.

6. A solid substrate coated with the composition as claimed in claim 1 and heated in excess of 500° C.

7. A solid substrate as claimed in claim 5 which is in the form of wire or cable.

* * * * *

UNITED STATES PATENT AND TRADEMARK OFFICE
CERTIFICATE OF CORRECTION

PATENT NO. : 4,269,753
DATED : May 26, 1981
INVENTOR(S) : Katsutoshi Mine; Tsuneo Maruyama; Kazuhide Takeshita It is certified that error appears in the above-identified patent and that said Letters Patent are hereby corrected as shown below:

In Column 2, line 26; the line reading "(A) 100 parts of a siloxane copolymer consisting essen-" should read "(A) 100 parts by weight of a siloxane copolymer consisting essen-".

Signed and Sealed this

Twenty-fifth Day of August 1981

[SEAL]

Attest:

GERALD J. MOSSINGHOFF

Attesting Officer

Commissioner of Patents and Trademarks